United States Patent
Nishimine et al.

(10) Patent No.: US 9,790,095 B2
(45) Date of Patent: Oct. 17, 2017

(54) METHOD AND SYSTEM FOR THE PRODUCTION OF SILICON OXIDE DEPOSIT

(71) Applicant: Shin-Etsu Chemical Co., Ltd., Tokyo (JP)

(72) Inventors: Masanobu Nishimine, Annaka (JP); Hirofumi Fukuoka, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 50 days.

(21) Appl. No.: 14/360,258

(22) PCT Filed: Feb. 28, 2013

(86) PCT No.: PCT/JP2013/056199
§ 371 (c)(1),
(2) Date: May 22, 2014

(87) PCT Pub. No.: WO2013/141024
PCT Pub. Date: Sep. 26, 2013

(65) Prior Publication Data
US 2014/0308193 A1 Oct. 16, 2014

(30) Foreign Application Priority Data

Mar. 22, 2012 (JP) .................................. 2012-065185
Dec. 21, 2012 (JP) .................................. 2012-279544
(Continued)

(51) Int. Cl.
*C01B 33/113* (2006.01)
*C23C 16/40* (2006.01)
(Continued)

(52) U.S. Cl.
CPC ........... *C01B 33/113* (2013.01); *H01M 4/386* (2013.01); *H01M 4/1395* (2013.01); *H01M 10/0525* (2013.01)

(58) Field of Classification Search
CPC ...... C23C 16/01; C23C 16/401–16/402; C01B 33/113
See application file for complete search history.

(56) References Cited

U.S. PATENT DOCUMENTS 5,096,685 A * 3/1992 Funahashi .............. B82Y 30/00
423/325
5,747,119 A * 5/1998 Hirata .................... C23C 16/54
427/248.1
(Continued)

FOREIGN PATENT DOCUMENTS

JP 63-103814 A 5/1988
JP 63-103815 A 5/1988
(Continued)

OTHER PUBLICATIONS

International Search Report, issued in PCT/JP2013/056199, dated Apr. 2, 2013.
(Continued)

*Primary Examiner* — Elizabeth Burkhart
(74) *Attorney, Agent, or Firm* — Birch, Stewart, Kolasch & Birch, LLP

(57) ABSTRACT

A silicon oxide deposit is continuously prepared by feeding a powder feed containing silicon dioxide powder to a reaction chamber, heating the feed at 1,200-1,600° C. to produce a silicon oxide vapor, delivering the vapor to a deposition chamber through a transfer line which is maintained at or above the temperature of the reaction chamber, for thereby causing silicon oxide to deposit on a cool substrate, and removing the silicon oxide deposit from the deposition chamber. Two deposition chambers are provided,
(Continued)

and the step of delivering the vapor is alternately switched from one to another deposition chamber.

10 Claims, 1 Drawing Sheet

(30) Foreign Application Priority Data

| Dec. 21, 2012 | (JP) | 2012-279556 |
|---|---|---|
| Dec. 21, 2012 | (JP) | 2012-279567 |
| Jan. 25, 2013 | (JP) | 2013-011658 |

(51) Int. Cl.
  *H01M 4/38* (2006.01)
  *H01M 4/1395* (2010.01)
  *H01M 10/0525* (2010.01)

(56) References Cited

U.S. PATENT DOCUMENTS

| 6,036,839 A * | 3/2000 | Kohut | B22F 1/0007 |
| | | | 205/280 |
| 6,821,495 B2 * | 11/2004 | Fukuoka | C01B 33/113 |
| | | | 423/325 |
| 2001/0053343 A1 | 12/2001 | Kohlet et al. | |
| 2007/0254102 A1 | 11/2007 | Fukuoka et al. | |
| 2013/0071752 A1 | 3/2013 | Kanno et al. | |

FOREIGN PATENT DOCUMENTS

| JP | 9-110412 A | 4/1997 |
| JP | 9-159366 A | 6/1997 |
| JP | 2001-220123 A | 8/2001 |
| JP | 2002-60212 A | 2/2002 |
| JP | 2003-192327 A | 7/2003 |
| JP | 2005-231957 A | 9/2005 |
| JP | 2007-290919 A | 11/2007 |
| JP | 2009-78949 A | 4/2009 |
| JP | 2011-139987 A | 7/2011 |
| WO | WO 2011/148569 A1 | 12/2011 |

OTHER PUBLICATIONS

Written Opinion of the International Searching Authority, issued in PCT/JP2013/056199, dated Apr. 2, 2013.
Office Action issued in the corresponding Japanese Patent Application No. 2013-036861 dated Jan. 26, 2016.

* cited by examiner

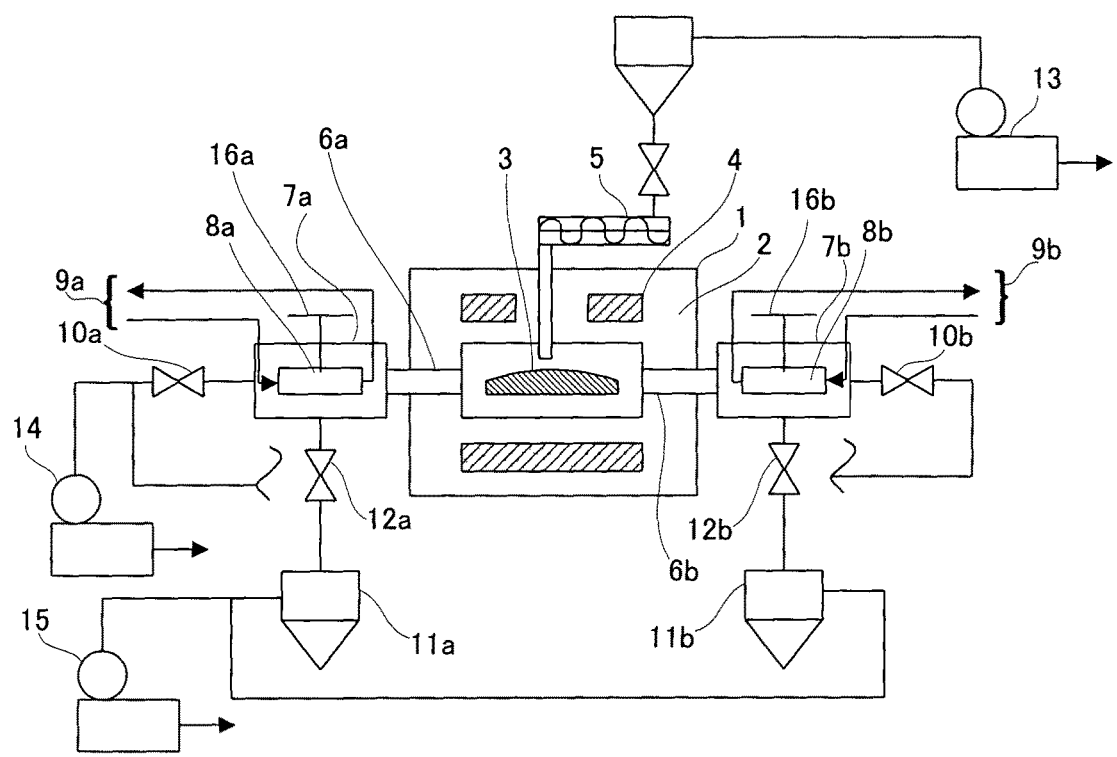

METHOD AND SYSTEM FOR THE PRODUCTION OF SILICON OXIDE DEPOSIT

TECHNICAL FIELD

This invention relates to a method and system for the production of silicon oxide deposit or powder suitable for use in wrapping film deposition and as negative electrode active material in lithium ion secondary batteries.

BACKGROUND ART

Several methods for the preparation of silicon oxide powder are known in the prior art. Patent Document 1 discloses a method including heat treating a charge of silicon dioxide base oxide powder in a reduced pressure, non-oxidizing atmosphere to generate SiO vapor, and condensing the SiO vapor in a gas phase, thereby continuously forming fine amorphous SiO particles with a size of 0.1 µm or less. Patent Document 2 proposes a method involving heating a silicon raw material for evaporation and depositing the vapor on a surface of a substrate having a coarse structure. Patent Document 3 discloses a method including feeding a powder feed containing silicon dioxide to a reaction chamber, producing silicon oxide gas, depositing on a surface of a cool substrate, and continuously recovering the silicon oxide deposit.

The method of Patent Document 1 is capable of continuous production, but fails to produce high purity silicon oxide powder because the SiO powder produced is a submicron-size powder which undergoes oxidization when taken out in the air. The method of Patent Document 2 can produce high purity silicon oxide powder, but does not lend itself to mass-scale production since it is of batchwise design. As a consequence, the silicon oxide powder becomes expensive. Although the method of Patent Document 3 can recover high purity silicon oxide powder in a continuous manner, the scraper used is based on a rotating unit which includes bearings which are less resistant to long-term operation, failing to maintain gas tightness.

CITATION LIST

Patent Documents

Patent Document 1: JP-A S63-103815
Patent Document 2: JP-A H09-110412
Patent Document 3: JP-A 2001-220123 (U.S. Pat. No. 6,821,495)

SUMMARY OF INVENTION

Technical Problem

An object of the invention is to provide a method and system for the sequential and effective production of high purity silicon oxide deposit at a low cost in a consistent manner.

Solution to Problem

The invention is directed to a method for continuously preparing a silicon oxide deposit by feeding a powder feed containing silicon dioxide powder to a reaction chamber heated at 1,200 to 1,600° C., thereby producing silicon oxide vapor therein, delivering the silicon oxide vapor to a deposition chamber through a transfer line which is maintained at a temperature equal to or higher than the temperature of the reaction chamber, letting silicon oxide deposit as a mass on a surface of a cool substrate in the deposition chamber, and removing the silicon oxide deposit. The inventors have found that better results are obtained when two or more deposition chambers are provided. The silicon oxide vapor is alternately delivered to either one of the deposition chambers. The steps of delivering the silicon oxide vapor to the deposition chamber and interrupting delivery are sequentially repeated among the two or more deposition chambers. Then the processes of deposition of silicon oxide and removing the silicon oxide deposit are conducted in parallel at the respectively different deposition chambers, and the processes of deposition and removing are sequential or continuous on the whole, whereby high-purity silicon oxide deposit is continuously prepared.

In one aspect, the invention provides a method for continuously preparing a silicon oxide deposit, comprising the steps of feeding a powder feed containing silicon dioxide powder to a reaction chamber, heating the feed in the reaction chamber in an inert gas under normal or reduced pressure at a temperature of 1,200 to 1,600° C. to effect reaction on the feed to produce a silicon oxide vapor, delivering the silicon oxide vapor to a deposition chamber through a transfer line, the deposition chamber having a substrate disposed therein, the substrate being cooled, the transfer line being maintained at a temperature equal to or higher than the temperature of the reaction chamber, for thereby causing silicon oxide to deposit on the substrate as a mass, and removing the silicon oxide deposit from the deposition chamber when the step of delivering the silicon oxide vapor to the deposition chamber is interrupted. According to the invention, at least two deposition chambers are provided. The step of delivering the silicon oxide vapor is alternately switched from one to another deposition chamber, and the steps of delivering the silicon oxide vapor to the deposition chamber and interrupting are sequentially repeated in each of the deposition chambers, whereby the silicon oxide deposit is sequentially recovered from the deposition chambers.

In a preferred embodiment, the powder feed is a mixture of a silicon dioxide powder and a metal silicon powder.

In a preferred embodiment, the step of removing the silicon oxide deposit includes interrupting the delivery of silicon oxide vapor to the deposition chamber and cooling the substrate, more preferably at a rate of at least 60° C./hr, so that the silicon oxide deposit may spontaneously peel off the substrate, whereupon the silicon oxide deposit is removed.

In a preferred embodiment, the substrate in the deposition chamber is cooled to a temperature of up to 1,000° C.

In a preferred embodiment, the step of delivering the silicon oxide vapor is alternately switched from one to another deposition chamber whenever the massive silicon oxide deposited on the substrate reaches a thickness of 2 to 100 mm.

In a preferred embodiment, the silicon oxide vapor is delivered to the deposition chamber at a flow rate of 0.5 to 50 kg/m²/hr relative to the surface area of the substrate in the deposition chamber.

In a preferred embodiment, the step of removing the silicon oxide deposit from the deposition chamber includes allowing the silicon oxide deposit to fall from the deposition chamber into a recovery mechanism which is connected to the deposition chamber via a valve, and recovering the deposit from the recovery mechanism after the valve is closed.

In a preferred embodiment, the silicon oxide deposit has a BET specific surface area of 0.5 to 30 m²/g and is typically used as negative electrode active material in lithium ion secondary batteries.

In another aspect, the invention provides a system for preparing a silicon oxide deposit, comprising a feed mechanism for feeding a powder feed containing silicon dioxide powder to a reaction chamber, the reaction chamber for effecting reaction on the powder feed to produce a silicon oxide vapor, at least two deposition chambers in which a substrate is disposed, where the silicon oxide vapor is deposited on the substrate, a cooling means for cooling each substrate, a line for delivering the silicon oxide vapor from the reaction chamber to each deposition chamber, a selector mechanism for alternately switching the delivery of silicon oxide vapor from one to another deposition chamber, and a recovery means for removing the silicon oxide deposit from each substrate.

The system may further comprise means for vibrating the substrate. Preferably, the recovery means includes a collector tank which is connected to the deposition chamber via a valve.

Advantageous Effects of Invention

With the method and system of the invention, high-purity silicon oxide deposit or precipitate is effectively and continuously prepared.

BRIEF DESCRIPTION OF DRAWING

The only FIGURE, FIG. 1 is a schematic illustration of a system for producing silicon oxide deposit according to the invention.

DESCRIPTION OF EMBODIMENTS

Briefly stated, a silicon oxide deposit is continuously prepared by feeding a powder feed containing silicon dioxide powder to a reaction chamber, heating the feed at 1,200-1,600° C. to produce a silicon oxide vapor, delivering the vapor to a deposition chamber through a transfer line which is maintained at or above the temperature of the reaction chamber, for thereby causing silicon oxide to deposit on a cool substrate, and removing the silicon oxide deposit from the deposition chamber, wherein at least two deposition chambers are provided, the step of delivering the silicon oxide vapor is alternately switched from one to another deposition chamber, and the steps of delivering the silicon oxide vapor to the deposition chamber and interrupting are sequentially repeated in each of the deposition chambers.

The powder feed containing silicon dioxide powder is typically a mixture of silicon dioxide powder and a reducing powder therefor. Exemplary reducing powders are metallic silicon compounds and carbon-containing powders. Of these, metallic silicon powder is preferably used since it is effective for enhancing reactivity and increasing a percent yield. When a mixture of silicon dioxide powder and metallic silicon powder is heated, reaction proceeds according to the following scheme.

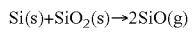

The silicon dioxide powder used herein preferably has an average particle size of up to 0.1 µm, typically 0.005 to 0.1 µm, and more preferably 0.005 to 0.08 µm. The metallic silicon powder used herein preferably has an average particle size of up to 30 µm, typically 0.05 to 30 µm, and more preferably 0.1 to 20 µm. If the average particle size of silicon dioxide powder exceeds 0.1 µm, or if the average particle size of metallic silicon powder exceeds 30 µm, there is a likelihood of reduced reactivity and hence, reduced productivity. It is noted that the average particle size is determined as cumulative weight average value $D_{50}$ (or median diameter) upon particle size distribution measurement by the laser light diffraction method.

The powder feed is fed to a reaction furnace or chamber (equipped with a heater) where it is heated and held at a temperature of 1,200 to 1,600° C., preferably 1,300 to 1,500° C., to produce a silicon oxide vapor. At temperatures below 1,200° C., the progress of reaction may be slow, resulting in a reduced productivity. Temperatures above 1,600° C. may cause the powder feed to melt and require a difficult choice of the furnace material.

The atmosphere in the furnace is an inert gas under normal or reduced pressure, preferably under a reduced pressure of up to 1,000 Pa. The reduced pressure is preferred because of ease of release of silicon oxide in vapor form. Exemplary inert gases include argon gas and helium gas.

To the reaction chamber, the powder feed is fed at suitable intervals or continuously by a feed mechanism or feeder, so that reaction may be continuously effected. The feeder may be a screw feeder capable of continuous supply, a valve/hopper/valve feeder capable of intermittent supply, or a combination thereof.

Once the silicon oxide vapor is produced in the reaction chamber, it is continuously delivered to a deposition chamber through a transfer line. According to the invention, the transfer line is heated and held at a temperature which must be equal to or higher than the temperature of the reaction chamber. If the temperature of the transfer line is below the temperature of the reaction chamber, the silicon oxide vapor will deposit and stick on the inner wall of the transfer line, causing troubles to the system and precluding stable operation. Heating the transfer line at an excessive temperature requires only an increased electric power cost while achieving no further benefits. The temperature of the transfer line is preferably in a range from the temperature of the reaction chamber to the temperature of the reaction chamber plus 200° C. (at maximum).

In the invention, two or more deposition chambers must be provided. Specifically the number of deposition chambers may be two, three, four or more. A selector mechanism for controlling the vapor flow is operated so as to deliver the silicon oxide vapor generated in the reaction chamber to either one of the plural deposition chambers. Disposed in the deposition chamber is a substrate which is cooled. Once delivered to the deposition chamber, the silicon oxide vapor contacts with the cooled substrate, cools down, and condenses on the substrate to form a silicon oxide deposit as solid mass. The substrate in the deposition chamber is preferably cooled at a temperature of up to 1,000° C. throughout the process. The substrate temperature to promote deposition (deposition temperature) may be equal to or lower than 1,000° C., specifically in a range of 200 to 1,000° C. The substrate temperature varies over such a wide range because delivery of silicon oxide vapor to the deposition chamber and delivery interrupt are repeated between two or more deposition chambers, so that the substrate temperature significantly differs between the initial and late stages of deposition. Deposition starts at a substrate temperature of at least 200° C., while effective deposition preferably takes place at a temperature of 300 to 900° C., and more preferably at 300 to 800° C. If the deposition temperature is reduced and maintained below the range, the resulting silicon oxide may become ultrafine particles which are too active.

In a preferred embodiment, the silicon oxide vapor is delivered to the deposition chamber at an areal flow rate of 0.5 to 50 kg/m$^2$/hr, more preferably 1 to 25 kg/m$^2$/hr, the areal flow rate being relative to the surface area of the cooled substrate in the deposition chamber. Within the range, silicon oxide can be deposited in high yields. If the amount of silicon oxide vapor is too much relative to the surface area of the substrate, then not all silicon oxide deposits on the substrate, but some may deposit on the wall of the deposition chamber and even escape out of the chamber. As a consequence, the yield of silicon oxide is reduced. On the other hand, if the amount of silicon oxide vapor is too small relative to the surface area of the substrate, then silicon oxide is overcooled on the substrate and becomes ultrafine particulate rather than a massive deposit. It is noted that the surface area of the substrate may be determined by the desired throughput and is typically in a range of 0.02 to 1,000 m$^2$, though not particularly limited. The supply rate of silicon oxide vapor is suitably adjusted in accordance with the surface area of the substrate, for example, in a range of 1 to 500 kg/hr so that the areal flow rate may fall in the above-defined range.

The supply rate of silicon oxide vapor may be determined from the supply rate of powder feed and the output of the heater. When the amount of powder feed available in the reaction chamber is maintained constant, the output of the heater is the total of a heat amount necessary to elevate the powder feed to the reaction temperature, a heat amount for reaction and sublimation, and a heat loss of the reaction furnace. Then the steady output of the heater indicates that the supply rate of powder feed is equal to the emission rate (supply rate) of silicon oxide vapor.

After silicon oxide vapor is delivered to a first deposition chamber for a predetermined time, the delivery of silicon oxide vapor is switched to a second deposition chamber. One exemplary criterion by which the delivery of silicon oxide vapor is switched from one to another deposition chamber is the thickness of massive silicon oxide deposit on the substrate surface. The criterion thickness is preferably 2 to 100 mm, more preferably 5 to 50 mm. If silicon oxide deposit is thinner than 2 mm, it has a high activity like silicon oxide deposited at low temperature and contains more ultrafine particles, with such premature switching leading to a lower yield. If silicon oxide deposit is thicker than 100 mm, the deposit experiences thermal hysteresis at elevated temperature, and such a thick deposit is difficult to peel off due to tenacious adhesion to the substrate, or even when peels off, some large fragments catch on the chamber wall and do not fall into a collector tank (recovery mechanism). The thickness of silicon oxide deposit may be measured through a scaled sight glass in the chamber wall.

After silicon oxide vapor is delivered to a first deposition chamber for a predetermined time, the delivery of silicon oxide vapor is switched to a second deposition chamber. Then the delivery of silicon oxide vapor to the first deposition chamber having received silicon oxide vapor is interrupted, the heat amount carried over by the vapor becomes extinct, and the first deposition chamber is cooled mainly by the substrate cooling mechanism. The purpose of depositing sublimated silicon oxide may be achieved typically by lowering the substrate temperature to or below 1,000° C. for thereby reducing the vapor pressure. In the quiescent duration of the first deposition chamber which is shut off from delivery of silicon oxide vapor, the substrate is preferably over-cooled by the cooling mechanism and due to blockage of the carry-over heat amount. With this over-cooling, the substrate is cooled to a temperature (peeling temperature) of 200 to 700° C., preferably 200 to 500° C. Notably, the substrate temperature is measured on the back surface of the substrate opposed to the surface in direct contact with silicon oxide vapor.

As a result of interruption of vapor delivery to the deposition chamber and cooling of the substrate, the silicon oxide deposit spontaneously peels off the substrate surface due to a difference in heat shrinkage between the substrate and the deposit, without a need for any physical force directly to the silicon oxide deposit by a scraper or the like. That is, no particular separation operation is necessary. "Spontaneously peels off" includes applying vibration to the substrate without physical force directly to the silicon oxide deposit for helping the silicon oxide deposit peel off the substrate. During the quiescent period when the delivery of silicon oxide vapor to the deposition chamber is interrupted, the silicon oxide deposit can be removed from the deposition chamber to a collector tank. The overall process enables efficient sequential or continuous recovery of silicon oxide deposit in two or more collector tanks. For the duration from the interruption of delivery of silicon oxide vapor to the deposition chamber to the spontaneous peel-off of silicon oxide deposit, the substrate is preferably cooled at a rate of at least 60° C./hr, more preferably at least 120° C./hr. The upper limit of the cooling rate is up to about 900° C./hr, though not critical. If the cooling rate is too low, the silicon oxide deposit may not peel off spontaneously before next switching of the deposition chambers, inhibiting efficient continuous production of silicon oxide deposits. The type of coolant for cooling the substrate is not particularly limited although a choice may be made among liquids such as water and heat carrier and gases such as air and nitrogen. When the heat carrier is used, heat recovery from the hot carrier at the external end is possible, for example, in the form of steam.

Although the type of substrate is not particularly limited, metal materials are preferred. Metal materials such as stainless steel, nickel-based alloys and titanium-based alloys are preferably used for ease of working. For example, stainless steel SUS304 (JIS) of common use has a high coefficient of linear or thermal expansion (CTE) of $20\times10^{-6}/°$ C. Nickel-based alloy (Hastelloy® C) and titanium-based alloy have a CTE of $13.4\times10^{-6}/°$ C. and $9.4$-$10.8\times10^{-6}/°$ C., respectively. On the other hand, silicon oxide is estimated to have a low CTE, though indefinite, because oxides generally have a low CTE, for example, quartz has a low CTE of $0.54\times10^{-6}/°$ C. As the temperature is lowered from the deposition temperature by the substrate cooling mechanism with any heat input being blocked, a shrinkage difference is brought about and eventually, the deposit peels off. Alternatively or additionally, the deposition chamber is equipped with an external vibration mechanism for applying vibration to the substrate for helping the silicon oxide deposit peel off the substrate.

In this way, the delivery of silicon oxide vapor is sequentially switched from one to another chamber. In an embodiment including two deposition chambers "a" and "b", for example, the delivery is switched in the order of a→b→a→b. Then the processes of deposition of silicon oxide and removing the silicon oxide deposit are conducted in parallel at the respectively different deposition chambers, and the processes of deposition and removing are sequential or continuous on the whole, that is, continuously produced. The time of sequential switching of silicon oxide vapor delivery from one to another deposition chamber is preferably 1 to 8 hours, more preferably within 4 hours although an appropriate time is selected in accordance with the time of silicon oxide deposit spontaneously peeling off and falling down, the amount of powder feed, the cooling rate of the substrate and other factors.

The number of deposition chambers is not particularly limited. The number and volume of deposition chambers are determined so as to have a sufficient time to allow for deposition of silicon oxide and removal of silicon oxide deposit. The selector mechanism for controlling the flow of silicon oxide vapor may include a switch valve upstream or downstream of each deposition chamber, preferably downstream of the deposition chamber so that the silicon oxide vapor flow is not disturbed.

When the delivery of silicon oxide vapor to a deposition chamber is interrupted, that deposition chamber is cooled by the substrate cooling mechanism. Besides, a shutter may be provided at the outlet of the transfer line to block radiant heat from the transfer line for facilitating cooling of the deposition chamber.

Once the silicon oxide deposit is collected in the collector tank, a damper or valve between the deposition chamber and the collector tank is closed to disconnect the collector tank from the deposition chamber. Then the deposit can be removed from the tank during continuous operation of the system, achieving more efficient removal. Since the deposition chamber is operated under high vacuum, the valve is preferably selected from those valves featuring gas tightness and a large opening, for example, ball valves, butterfly valves and gate valves. Once the silicon oxide deposit peels off the substrate, preferably peels off spontaneously, it falls under gravity into the recovery mechanism or collector tank which is connected to the deposition chamber via the valve. With the valve closed, the collector tank then resumes atmospheric pressure, whereupon the silicon oxide deposit is recovered.

Preferably the valve used in vacuum has a leakage of up to $1 \times 10^{-3}$ Pa·m$^3$/s, with a valve having a minimal leakage being more preferred. Also preferably the valve has a large opening size enough for smooth passage of fragments of the massive deposit, specifically a size of at least 100 A (JIS nominal size). Since fragments to ultrafine particles of the massive deposit pass through the valve, the valve resistant to particle jamming is preferably selected.

Once the silicon oxide deposit is peeled and removed from the substrate in a first deposition chamber, the first deposition chamber is empty of deposit, that is, ready to receive silicon oxide vapor again. For the duration when the silicon oxide deposit is removed from the first deposition chamber, the selector mechanism is operated such that the delivery of silicon oxide vapor is switched to a second deposition chamber. This results in deposition in second chamber and removal in first chamber. Deposition and removal are alternately repeated between different chambers, attaining continuous operation.

The resulting massive silicon oxide deposit has a purity of 99.9 to 99.95% by weight of silicon oxide. Advantageously, high-purity silicon oxide is available.

Using a suitable grinder and classifier, the massive silicon oxide deposit may be comminuted into a silicon oxide powder, typically having an average particle size of 0.01 to 30 μm and a BET specific surface area of 0.5 to 30 m$^2$/g. The silicon oxide powder is suitable for use in wrapping film deposition and as negative electrode active material in lithium ion secondary batteries. As used herein, the term "BET specific surface area" is a measurement by the BET single-point method based on $N_2$ gas adsorption.

Referring to FIG. 1, there is illustrated one exemplary system which can be used in practicing the above method. The system for continuously preparing silicon oxide deposit includes a feed mechanism for feeding a powder feed containing silicon dioxide powder to a reaction chamber, the reaction chamber for effecting reaction on the powder feed to produce a silicon oxide vapor, at least two deposition chambers in which a substrate is disposed, where the silicon oxide vapor is deposited on the substrate, a cooling mechanism for cooling each substrate, a transfer line for delivering the silicon oxide vapor from the reaction chamber to each deposition chamber, a selector mechanism for alternately switching the delivery of silicon oxide vapor from one to another deposition chamber, and a recovery mechanism for removing the silicon oxide deposit from each substrate.

The system is described in detail. Notably, components are connected in fluid communication. A reaction furnace 1 defines therein a reaction chamber 2. The furnace 1 is equipped with a heater 4. A feed mechanism 5 is connected to the reaction chamber 2 which is connected to two or more deposition chambers 7 via transfer line 6. The deposition chambers are associated with a selector mechanism 10. In an embodiment including two deposition chambers 7a, 7b, each deposition chamber 7 is connected to the reaction chamber 2 via the transfer line 6 and controlled by the selector mechanism 10. At a certain point of time, at least one deposition chamber 7 is connected to a vacuum pump 14 via the selector mechanism 10. The deposition chamber 7 is equipped with an external vibration mechanism 16 for applying vibration to the substrate 8. Additionally, the deposition chamber 7 is connected to a collector tank 11 via a valve 12 so that the collector tank may be disconnected from the deposition chamber 7 when the valve 12 is closed. A vacuum pump 13 is connected to the feeder mechanism 5, a vacuum pump 14 is connected to the deposition chambers 7, and a vacuum pump 15 is connected to the collector tanks 11. Of these components, the transfer line 6, deposition chamber 7, substrate 8, cooling mechanism 9, selector mechanism 10, collector tank 11, valve 12, and vibrator 16 are provided in symmetry. That is, a pair of deposition chambers 7a and 7b are provided, and so forth. Whenever the flow of silicon oxide vapor is switched by the selector mechanism, the components on one branch line are similarly operated.

In operation, the charge feed mechanism 5 feeds a powder feed 3 containing silicon dioxide powder to the reaction chamber 2 in a continuous or intermittent manner. In the reaction chamber 2 which is heated at a temperature of 1,200 to 1,600° C. by the heater 4, the powder feed 3 containing silicon dioxide powder is reacted to produce a silicon oxide vapor, which is delivered to one of plural deposition chambers 7 through the transfer conduit or line 6. The transfer conduit 6 is equipped with a heater (not shown) so that the conduit may be maintained at a temperature which is equal to or higher than the temperature of the reaction chamber 2. The transfer conduits 6 connect the reaction chamber to plural deposition chambers 7. The substrate 8 is disposed in the deposition chamber 7 and cooled to a predetermined temperature by the cooling mechanism 9. The flow of silicon oxide vapor is controlled by the selector mechanism 10. In an embodiment including two deposition chambers 7a, 7b, when the first chamber 7a is selected, the selector mechanism (or valve) 10a associated with the first chamber 7a is opened and the selector mechanism (or valve) 10b associated with the second chamber 7b is closed. Once the reaction chamber 2 is evacuated by the vacuum pump 14 and heated at the predetermined temperature by the heater 4, the powder feed is heated to generate silicon oxide vapor, which flows to the first deposition chamber 7a where it deposits on the first substrate 8a in chamber 7a. After deposition is continued for a predetermined time, the selector mechanism 10b is opened, and the selector mechanism 10a is closed. Then silicon oxide vapor flows to the second deposition chamber 7b where it deposits on the second substrate 8b in chamber 7b.

As a result of interrupted delivery of silicon oxide vapor to first chamber 7a and cooling of first substrate 8a, the silicon oxide deposit on first substrate 8a peels off substrate 8a and falls down into the collector tank 11a. The collector tank 11a is disconnected from the deposition chamber 7a by the valve 12a. With the valve 12a closed, the collector tank 11a is allowed to resume the pressure, whereupon the silicon oxide deposit thus collected is removed out of the tank 11a. At this point of time, the first deposition chamber 7a is empty and ready to receive silicon oxide vapor again. For the duration when silicon oxide solid is removed from first chamber 7a, the selector mechanism is selected to switch the delivery of silicon oxide vapor to the second deposition chamber 7b. The first deposition chamber 7a is ready to receive silicon oxide vapor except the duration when silicon oxide solid is removed from first chamber 7a. Then the silicon oxide deposit can be removed from one deposition chamber 7 despite the continuous operation of the system. Vacuum pumps 13, 14 and 15 are connected to the feeder mechanism (or hopper) 5, deposition chamber 7, and collector tank 11, respectively. Of these components, the transfer conduit 6, deposition chamber 7, substrate 8, cooling mechanism 9, selector mechanism 10, collector tank 11, and valve 12 are provided in symmetry. That is, a pair of deposition chambers 7a and 7b are provided, and so forth. Whenever the flow of silicon oxide vapor is switched by the selector mechanism, the components on the other branch line are similarly operated.

Since the system illustrated above switches the flow of silicon oxide vapor to either one of the deposition chambers 7a and 7b, silicon oxide deposit can be produced in a continuous and consistent manner.

EXAMPLE

Examples of the invention are given below by way of illustration and not by way of limitation.

Example 1

A silicon oxide deposit was produced using the system illustrated in FIG. 1. The system had an argon atmosphere. The powder feed was a powder mixture obtained by mixing equimolar amounts of silicon dioxide powder having an average particle size of 0.02 μm and a BET specific surface area of 200 m$^2$/g and metallic silicon powder having an average particle size of 10 μm and a BET specific surface area of 3 m$^2$/g in an agitator. The reaction furnace 1 defining the reaction chamber 2 with a volume of 40 L was initially charged with 6 kg of the powder mixture. Of the two branch lines, deposition chamber 7a was first chosen for delivery and deposition of silicon oxide vapor. The selector mechanism was operated so that valve 10a was open and valve 10b was closed. In the argon atmosphere, the vacuum pump 14 was operated to reduce the pressure of reaction chamber 2 to 10 Pa, the heater 4 was actuated to heat and hold the chamber at 1,400° C. The transfer conduits 6 were also heated and held at 1,400° C. Water was used as the coolant to cool the substrate 8 of stainless steel (140 mm×600 mm, surface area 0.084 m$^2$). From a pressure increase in the reaction chamber and a temperature rise in the deposition chamber, formation of silicon oxide vapor was confirmed. When the reaction chamber reached a temperature of 1,400° C., the substrate in the deposition chamber was at a temperature of 300° C. Once the reaction became steady, the feed mechanism 5 was operated to feed the powder mixture at a rate of 2 kg/hr. The pressure in the reaction chamber and the temperature in the deposition chamber remained constant even after the feed of the powder mixture, indicating continuous reaction. The system was operated for 4 hours since the reaction chamber reached 1,400° C. The temperature of the substrate in the deposition chamber was 650° C. (deposition temperature). The flow rate of silicon oxide vapor delivered per substrate surface area was 23 kg/m$^2$/hr. The thickness of silicon oxide deposit was measured to be 30 mm through a scaled sight glass in the chamber wall.

At this point of time, the selector mechanism was operated so that valve 10a was closed and valve 10b was open. Then silicon oxide vapor was delivered to the second deposition chamber 7b where it was deposited on the second substrate 8b. Since the deposition chamber 7a received no further heat input and was cooled by the cooling mechanism, the temperature of the substrate lowered to 250° C. (peeling temperature) after 2 hours. Then the silicon oxide deposit spontaneously peeled off the substrate surface and fell into the collector tank 11a having a volume of 50 L. The substrate was cooled at a rate of 200° C./hr. The valve 12a was a gate valve having a JIS nominal size of 200 A. With the valve 12a closed, the collector tank 11a resumed pressure whereupon the silicon oxide deposit was removed. Thereafter, the deposition chamber was switched every 4 hours until the operating time totaled 168 hours. This proved that continuous operation was possible. When the collector tank 11a resumed pressure, with the valve 12a closed, the pressure within the deposition chamber remained unchanged, indicating no leakage. The silicon oxide solid was recovered at a rate of 1.9 kg/hr, with a yield of 95%. The silicon oxide deposit had a BET specific surface area of 8 m$^2$/g and a purity of at least 99%. At the end of operation, the interior of the components was visually observed, finding no significant residues in the reaction chamber and transfer lines. The substrates in the deposition chambers were kept clean, indicating complete peel-off of silicon oxide deposit.

Example 2

The procedure of Example 1 was repeated until silicon oxide vapor was delivered to and deposited in the deposition chamber 7b. The vibrating mechanism 16a was operated to apply vibration to the substrate 8a in chamber 7a. Since the deposition chamber 7a received no further heat input and was cooled by the cooling mechanism, the temperature of the substrate lowered to 390° C. (peeling temperature) after 1 hour. Then the silicon oxide deposit spontaneously peeled off the substrate surface and fell into the collector tank 11a. The substrate was cooled at a rate of 260° C./hr. With the valve 12a closed, the collector tank 11a resumed pressure whereupon the silicon oxide deposit was removed. Thereafter, the deposition chamber was switched every 4 hours until the operating time totaled 168 hours. This proved that continuous operation was possible. The silicon oxide solid was collected at a rate of 1.9 kg/hr, with a yield of 95%. The silicon oxide deposit had a BET specific surface area of 8 m$^2$/g and a purity of at least 99%. At the end of operation, the interior of the components was visually observed, finding no significant residues in the reaction chamber and transfer lines. The substrates in the deposition chambers were kept clean, indicating complete peel-off of silicon oxide deposit.

Example 3

Silicon oxide deposit was continuously produced under the same conditions as in Example 2 except that nitrogen was used as the coolant to cool the stainless steel substrate. As in Example 2, the selector mechanism was selected to switch the deposition chambers after 4 hours since the reaction chamber reached 1,400° C. The temperature of the substrate in the deposition chamber was initially 780° C. and lowered to 520° C. after 2 hours, indicating a cooling rate of 130° C./hr. At the end of operation, the interior of the components was visually observed, finding no significant residues in the reaction chamber and transfer lines. The substrates in the deposition chambers were kept clean, indicating complete peel-off of silicon oxide deposit.

Example 4

Silicon oxide deposit was continuously produced under the same conditions as in Example 1 except that the supply rate of silicon oxide vapor was adjusted so as to give a flow rate per substrate surface area of 6 kg/m$^2$/hr. The silicon oxide deposit spontaneously peeled off the substrate surface and fell into the collector tank 11a. The silicon oxide deposit had a BET specific surface area of 10 m$^2$/g and a purity of at least 99%. At the end of operation, the interior of the components was visually observed, finding no significant residues in the reaction chamber and transfer lines. The substrates in the deposition chambers were kept clean, indicating complete peel-off of silicon oxide deposit.

Example 5

Silicon oxide deposit was continuously produced under the same conditions as in Example 1 except that a ball valve of 200 A (JIS nominal size) was used as the valve 12a instead of the gate valve of 200 A. The system was operated over a total time of 168 hours, proving that continuous operation was possible. When the collector tank 11a resumed pressure, with the valve 12a closed, the pressure within the deposition chamber remained unchanged, indicating no leakage. The valve was devoid of powder jamming.

Comparative Example 1

Silicon oxide deposit was continuously prepared by the same procedure as in Example 1 except that the temperature of the transfer line was 1,000° C. After 48 hours of operation from the start, the transfer line was clogged with silicon oxide deposit. The operation could no longer be continued.

Comparative Example 2

Silicon oxide deposit was continuously prepared by the same procedure as in Example 1 except that the substrate in the deposition chamber was not cooled. As in Example 1, after the system was operated for 4 hours since the reaction chamber reached 1,400° C., the selector mechanism was operated to switch the deposition chamber from one to the other. The substrate temperature in the deposition chamber was initially 950° C. and after 4 hours, lowered only to 750° C., at which the silicon oxide deposit did not peel off. The cooling rate was 50° C./hr. This inhibited to switch the deposition chamber, failing in continuous operation.

The massive silicon oxide deposit obtained in each Example was ground into silicon oxide particles. When a lithium ion secondary battery was constructed using this silicon oxide powder as the negative electrode active material, satisfactory battery properties were obtained.

REFERENCE SIGNS LIST 1 reaction furnace
2 reaction chamber
3 powder feed
4 heater
5 feed mechanism
6a, 6b transfer line
7a, 7b deposition chamber
8a, 8b substrate
9a, 9b cooling mechanism
10a, 10b selector mechanism
11a, 11b collector tank
12a, 12b valve
13-15 vacuum pump
16a, 16b vibration mechanism

The invention claimed is:
1. A method for continuously preparing a silicon oxide deposit, comprising the steps of:
feeding a powder feed containing silicon dioxide powder to a reaction chamber,
heating the feed in the reaction chamber in an inert gas under normal or reduced pressure at a temperature of 1,200 to 1,600° C. to effect reaction on the feed to produce a silicon oxide vapor,
delivering the silicon oxide vapor from the reaction chamber to a deposition chamber through a transfer line, the deposition chamber having a substrate disposed therein, the substrate being cooled, the transfer line being maintained at a temperature equal to or higher than the temperature of the reaction chamber, for thereby causing silicon oxide to deposit on the substrate as a mass, and vibrating the substrate by a vibrator to remove the silicon oxide deposit from the substrate, and
removing the silicon oxide deposit from the deposition chamber when the step of delivering the silicon oxide vapor to the deposition chamber is interrupted,
wherein at least two deposition chambers and a selector mechanism for alternately switching the delivery of silicon oxide vapor from one to another deposition chamber are provided, the step of delivering the silicon oxide vapor is alternately switched from one to another deposition chamber, and the steps of delivering the silicon oxide vapor to the deposition chamber and interrupting are sequentially repeated in each of the deposition chambers, whereby the silicon oxide deposit is recovered from the at least two deposition chambers, and the step of removing the silicon oxide deposit includes interrupting the delivery of silicon oxide vapor to the deposition chamber and cooling the substrate so that the silicon oxide deposit spontaneously peels off from the substrate, the silicon oxide deposit falls from the deposition chamber into a recovery mechanism which is connected to the deposition chamber via a valve, and recovering the deposit from the recovery mechanism after the valve is closed and the recovery mechanism resumes atmospheric pressure, whereupon the silicon oxide deposit is obtained, wherein the substrate is cooled at a rate of at least 60° C./hr for the duration from the interruption of delivery of silicon oxide vapor to the deposition chamber to the spontaneous peel-off of silicon oxide deposit.

2. The method of claim 1, wherein the powder feed is a mixture of a silicon dioxide powder and a metal silicon powder.

3. The method of claim 1, wherein the substrate in the deposition chamber is cooled to a temperature of up to 1,000° C.

4. The method of claim 1, wherein the step of delivering the silicon oxide vapor is alternately switched from one to another deposition chamber whenever the mass of silicon oxide deposited on the substrate reaches a thickness of 2 to 100 mm.

5. The method of claim 1, wherein the silicon oxide vapor is delivered to the deposition chamber at a flow rate of 0.5 to 50 kg/m$^2$/hr relative to the surface area of the substrate in the deposition chamber.

6. The method of claim 1, wherein the silicon oxide deposit has a BET specific surface area of 0.5 to 30 m$^2$/g.

7. The method of claim 1, wherein the silicon oxide deposit is used as negative electrode active material in lithium ion secondary batteries.

8. The method of claim 1, wherein the substrate is cooled at a rate of at least 120° C./hr.

9. The method of claim 1, wherein the substrate is cooled at a rate of at least 200° C./hr.

10. A system for preparing a silicon oxide deposit, comprising:

a feed mechanism for feeding a powder feed containing silicon dioxide powder to a reaction chamber;

the reaction chamber for effecting reaction on the powder feed to produce a silicon oxide vapor;

at least two deposition chambers in which only a substrate is disposed, where the silicon oxide vapor is deposited on the substrate;

a cooling mechanism for cooling each substrate;

a transfer line for delivering the silicon oxide vapor from the reaction chamber to each deposition chamber;

a selector mechanism for alternately switching the delivery of silicon oxide vapor between the deposition chambers; and a recovery mechanism for removing the silicon oxide deposit from each substrate, and a mechanism that vibrates the substrate, wherein the selector mechanism comprises at least two valves and a vacuum pump, the vacuum pump being connected to each of the deposition chambers via one of the at least two valves, and the recovery mechanism is connected to the deposition chamber via another valve.

* * * * *